(12) United States Patent
Matsunaga

(10) Patent No.: US 10,871,926 B2
(45) Date of Patent: Dec. 22, 2020

(54) INFORMATION PROCESSING APPARATUS INCLUDING SRAM CAPABLE OF SHIFTING TO PLURALITY OF POWER SAVING MODES ACCORDING TO CONTROL SIGNAL AND CONTROL METHOD THEREOF

(71) Applicant: CANON KABUSHIKI KAISHA, Tokyo (JP)

(72) Inventor: Daisuke Matsunaga, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/156,896

(22) Filed: Oct. 10, 2018

(65) Prior Publication Data

US 2019/0114118 A1   Apr. 18, 2019

(30) Foreign Application Priority Data

Oct. 18, 2017  (JP) ................................. 2017-202094
Aug. 8, 2018  (JP) ................................. 2018-149433

(51) Int. Cl.
*G06F 3/12* (2006.01)
*H04N 1/00* (2006.01)
(Continued)

(52) U.S. Cl.
CPC ............. *G06F 3/122* (2013.01); *G06F 1/32* (2013.01); *G06F 1/3209* (2013.01); *G06F 1/3228* (2013.01); *G06F 1/3262* (2013.01); *G06F 1/3275* (2013.01); *G06F 1/3284* (2013.01); *G06F 1/3287* (2013.01); *G06F 3/1229* (2013.01); *G06F 3/1259* (2013.01); *H04N 1/00885* (2013.01); *H04N 1/00896* (2013.01)

(58) Field of Classification Search
None
See application file for complete search history.

(56) References Cited

U.S. PATENT DOCUMENTS

2010/0218025 A1\* 8/2010 Saito ..................... G06F 1/3203
713/324
2016/0070222 A1\* 3/2016 Fukushima ........ G03G 15/5004
399/88

FOREIGN PATENT DOCUMENTS

JP   2017-184049 A   10/2017
WO  2016-157412 A1  10/2016

OTHER PUBLICATIONS

Sawada Yohei et al., Semiconductor Device, Oct. 6, 2016, Renesas Electronics Corp, pp. 1-25, WO_JP2016157412A1_translation.pdf (a machine translation) (Year: 2016).\*

\* cited by examiner

*Primary Examiner* — Dov Popovici
(74) *Attorney, Agent, or Firm* — Canon U.S.A., Inc. IP Division

(57) ABSTRACT

There is provided a control apparatus for controlling a static random access memory (SRAM) capable of shifting from a first power mode to a second power mode that is capable of holding data and saving more power than the first power mode or a third power mode that is not capable of holding data but is capable of saving more power than the second power mode. The control apparatus includes a first instruction unit configured to output an instruction for shifting the SRAM to the second power mode based on a state of the control apparatus and a second instruction unit configured to output an instruction for shifting the SRAM to the third power mode based on a state of the control apparatus.

12 Claims, 13 Drawing Sheets

(51) Int. Cl.
*G06F 1/3234* (2019.01)
*G06F 1/3209* (2019.01)
*G06F 1/3287* (2019.01)
*G06F 1/3228* (2019.01)
*G06F 1/32* (2019.01)

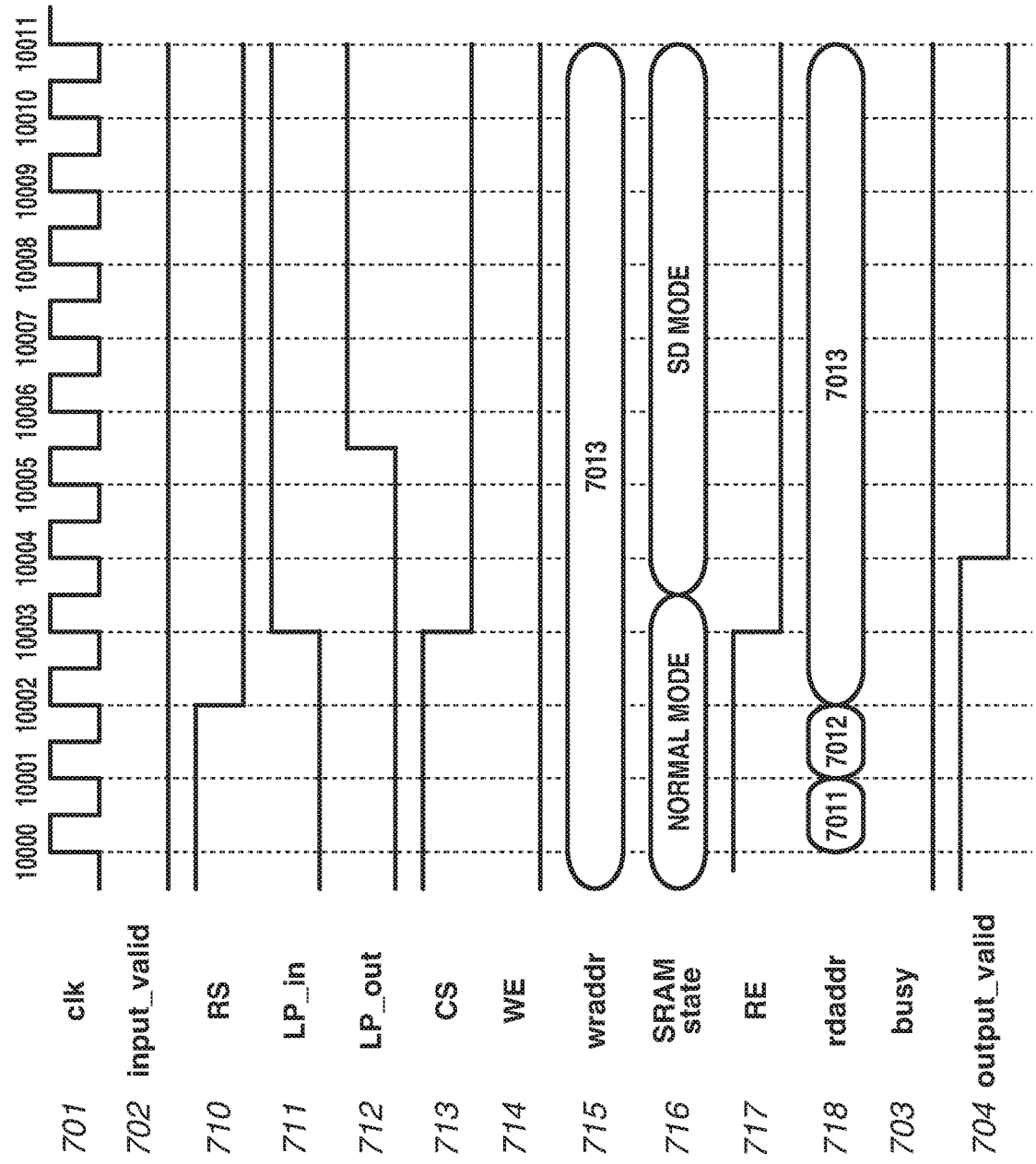

FIG.10

| | MAIN CONTROLLER | | OPERATION UNIT | SCANNER | PRINTER |
|---|---|---|---|---|---|
| STAND-BY | SRAM 404 | ON | ON | ON | ON |
| | | RS/ NORMAL MODE | | | |
| SLEEP MODE | | ON | ON | OFF | OFF |
| | | SD MODE | | | |

INFORMATION PROCESSING APPARATUS INCLUDING SRAM CAPABLE OF SHIFTING TO PLURALITY OF POWER SAVING MODES ACCORDING TO CONTROL SIGNAL AND CONTROL METHOD THEREOF

BACKGROUND OF THE INVENTION

Field of the Invention

One disclosed aspect of the embodiments relates to an information processing apparatus including a static random access memory (SRAM) capable of shifting to a plurality of power saving modes according to a control signal, and a control method thereof.

Description of the Related Art

There has been known an SRAM having two power saving modes such as a resume stand-by (RS) mode and a shutdown (SD) mode in addition to a normal operation mode in which data is readable and writable (International Publication No. 2016-157412). The RS mode is a power saving mode for reducing power consumption of the SRAM in a state where written data is held. The SD mode is a power saving mode that can save power more than the RS mode, in which written data is not held.

An information processing apparatus such as a multifunction peripheral has a normal power state in which scanning or printing is executable and a power saving state that can save power more than the normal power state. When the multifunction peripheral does not execute scanning or printing, most of the functions of the multifunction peripheral, such as a scanning function and a printing function, are not necessary. Therefore, power supplied to unnecessary devices is stopped in order to reduce the power consumption.

On the other hand, when scanning or printing is to be executed, power is supplied to the scanner unit or the printer unit and relevant devices, so that the multifunction peripheral returns to the normal power state from the power saving state. However, even in the normal power state, there may be a period in which a part of the devices in the image processing unit does not execute data processing. In order to reduce the power consumption of the SRAM in the image processing unit when data processing is not executed, in Japanese Patent Application Laid-Open No. 2017-184049, the SRAM is brought into the normal operation mode when data is written into or read from the SRAM, and the SRAM is brought into the RS mode when data is not written into or read from the SRAM.

In Japanese Patent Application Laid-Open No. 2017-184049, in order to prevent data stored in the SRAM from being lost, the SRAM is brought into the RS mode until data written into the SRAM is read out, so that data can be held while realizing power saving of the SRAM. However, according to Japanese Patent Application Laid-Open No. 2017-184049, the SRAM is in the RS mode even if all of data in the SRAM is read out. In other words, in Japanese Patent Application Laid-Open No. 2017-184049, because the SRAM is in the RS mode even in a period during which data stored in the SRAM does not have to be held, power consumption of the SRAM cannot be reduced further.

SUMMARY OF THE INVENTION

One disclosed aspect of the embodiments is directed to a technique of further improving power saving of the SRAM by shifting the SRAM to the SD mode that can save power more than the RS mode in a period during which stored data does not have to be held.

According to an aspect of the embodiments, a control apparatus for controlling a static random access memory (SRAM) capable of shifting from a first power mode to a second power mode that can hold data and can save power more than the first power mode or a third power mode that cannot hold data but can save more power than the second power mode, includes a first instruction unit configured to output an instruction for shifting the SRAM to the second power mode based on a state of the control apparatus, and a second instruction unit configured to output an instruction for shifting the SRAM to the third power mode based on a state of the control apparatus.

Further features of the disclosure will become apparent from the following description of exemplary embodiments with reference to the attached drawings.

BRIEF DESCRIPTION OF THE DRAWINGS

FIGS. 7A and 7B are timing charts illustrating timing of shifting and returning the SRAM to and from a power saving mode according to the first exemplary embodiment.

FIG. 10 is a table illustrating a correspondence between a power mode of an image forming apparatus and a power mode of an SRAM according to a third exemplary embodiment.

DESCRIPTION OF THE EMBODIMENTS

<Image Forming Apparatus>

Figure 1:
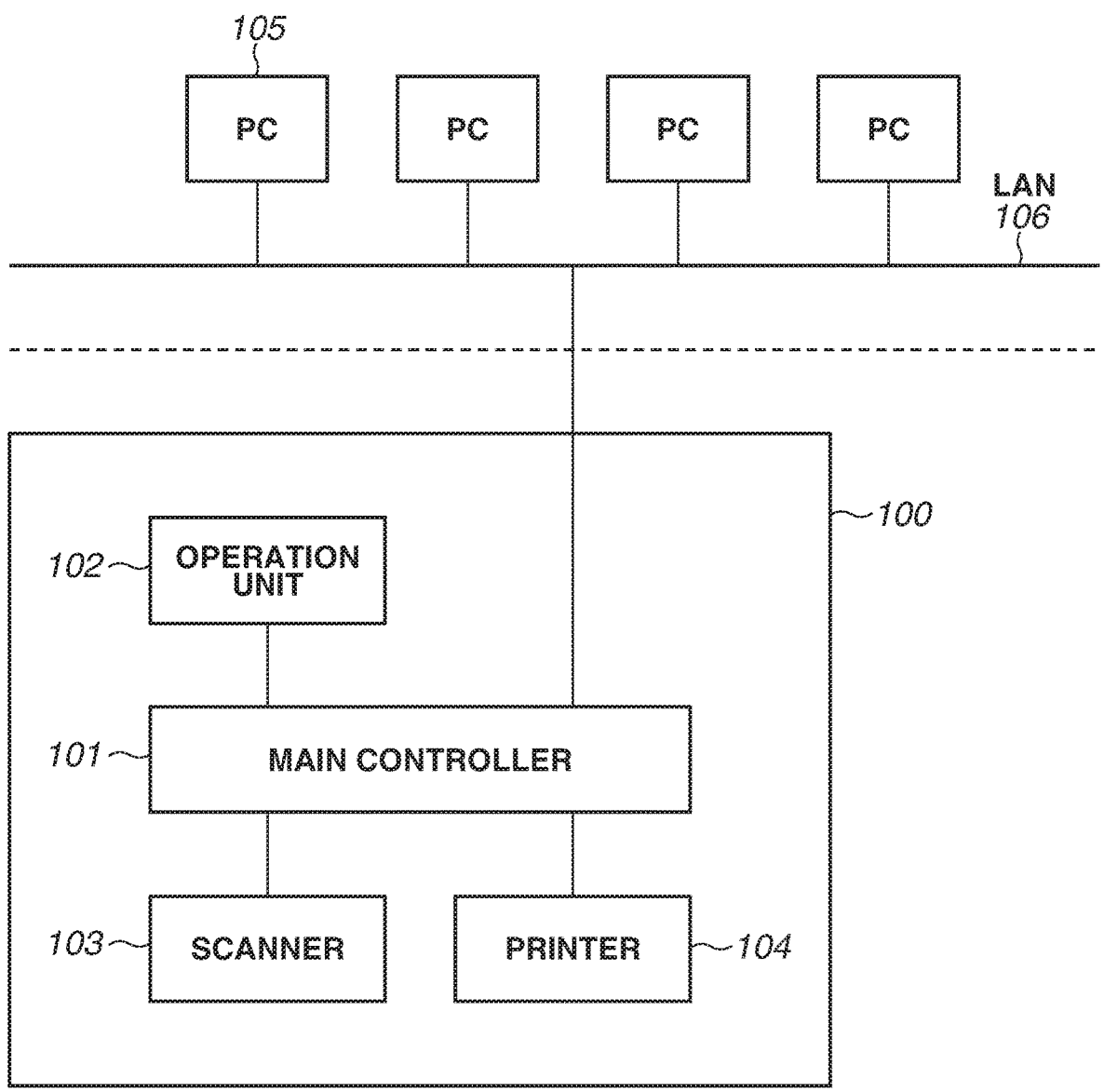
FIG. 1 is a block diagram illustrating an overall configuration of an image forming apparatus according to a first exemplary embodiment.

FIG. 1 is a block diagram illustrating an overall configuration of an image forming apparatus according to a first exemplary embodiment.

An image forming apparatus 100 has a printing function for printing an image on a recording medium such as a sheet.

The image forming apparatus 100 also has a scanning function for scanning a document and transmitting an input image via a network. In the present exemplary embodiment, the image forming apparatus 100 is a multifunction printer.

The image forming apparatus 100 includes a main controller 101, an operation unit 102, a scanner 103, and a printer 104. The operation unit 102, the scanner 103, and the printer 104 are communicably connected to the main controller 101 and controlled according to an instruction from the main controller 101.

The main controller 101 is connected to a local area network (LAN) 106, and communicably connected to a personal computer (PC) 105 via the LAN 106. The scanner 103 reads an image formed on a sheet and outputs red-green-blue (RGB) color image data or gray-scale image data. Further, the printer 104 prints an image on a recording medium such as a sheet based on raster image data.

Figure 2:
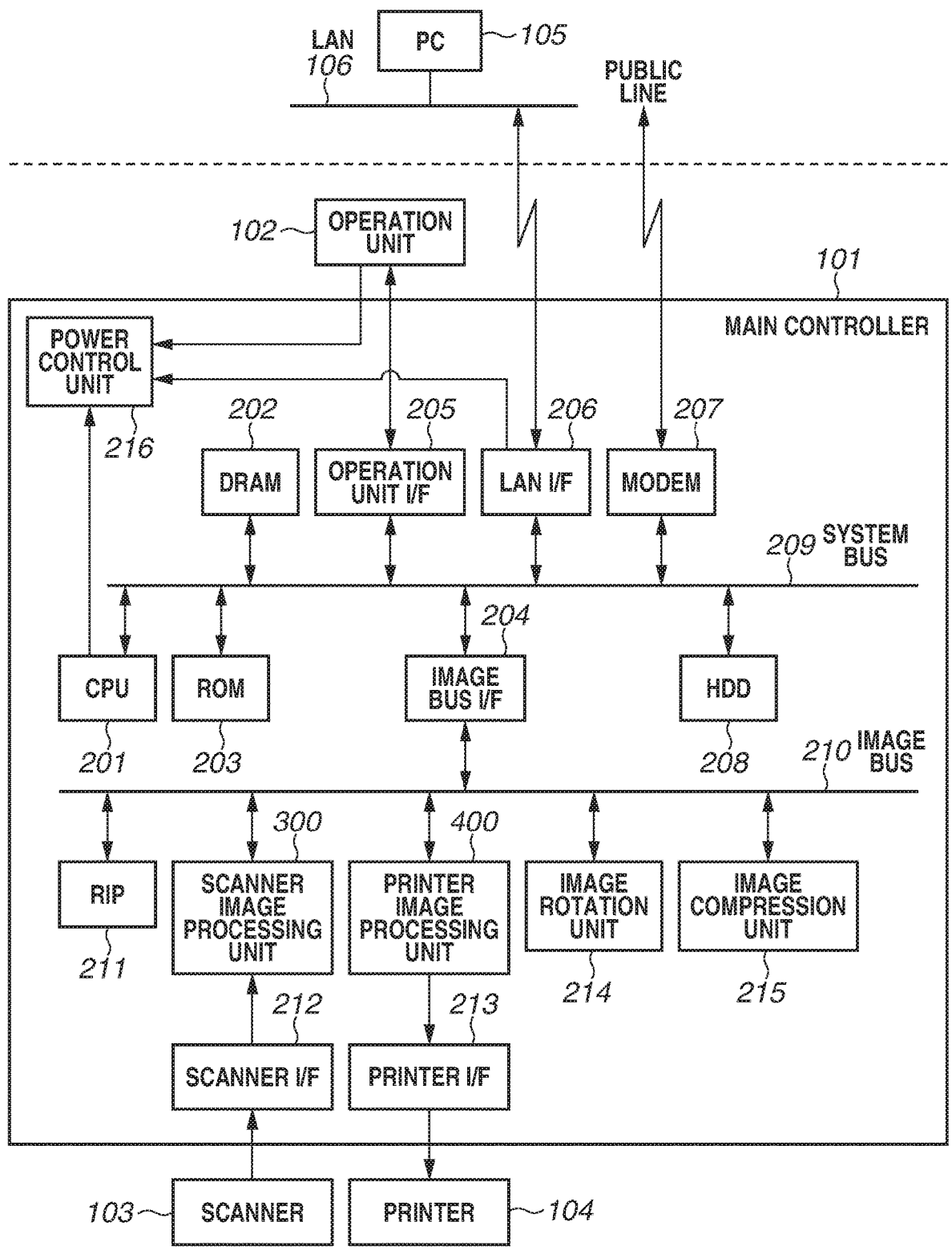
FIG. 2 is a block diagram illustrating a detailed configuration of a main controller according to the first exemplary embodiment.

FIG. 2 is a block diagram of an image forming apparatus. For example, blocks of the main controller 101 are mounted on a semiconductor integrated circuit such as an application specific integrated circuit (ASIC) serving as an image processing circuit. In the present exemplary embodiment, although the blocks of the main controller 101 are mounted on one ASIC, each of the blocks may be mounted on an individual ASIC.

The main controller 101 controls the scanner 103 connected thereto via a scanner interface (I/F) 212 and the printer 104 connected thereto via a printer I/F 213. The main controller 101 is connected to the LAN 106 via a LAN I/F 206. Further, the main controller 101 is connected to a public line via a modem 207. The main controller 101 can transmit and receive a file to and from an external device such as the PC 105 through the LAN 106 or the public line.

The main controller 101 includes a central processing unit (CPU) 201 serving as a main control unit. The CPU 201 is connected to a dynamic random access memory (DRAM) 202, a read only memory (ROM) 203, an image bus I/F 204, an operation unit I/F 205, a LAN I/F 206, the modem 207, and a hard disk drive (HDD) 208 via a system bus 209.

The DRAM 202 is a main storage device for the main controller 101 and provides a work area to the CPU 201. Further, the DRAM 202 is also used as an image memory for temporarily storing image data. The ROM 203 stores a boot program of a system. The operation I/F 205 executes transmission between the main controller 101 and the operation unit 102. For example, the operation unit I/F 205 transmits display image data to the operation unit 102, and transmits information received through the operation unit 102 to the CPU 201. The LAN I/F 206 executes data transmission and reception between the CPU 201 and the LAN 106. The modem 207 executes data transmission and reception between the CPU 201 and the public line. The HDD 208 is an auxiliary storage device that stores various data used in the image forming apparatus 100, for example, image data, address book data, log data, and user data.

The image data I/F 204 is an interface for executing transmission and reception of image data between the system bus 209 and the image bus 210 at high speed. The image data I/F 204 converts a data structure of the image data. In other words, the image bus I/F 204 functions as a bus bridge. A raster image processor (RIP) 211, a scanner image processing unit 300, a printer image processing unit 400, an image rotation unit 214, and an image compression unit 215 are connected to the image bus 210.

For example, the RIP 211 executes processing of rasterizing page description language (PDL) data transmitted from the PC 105 and received via the LAN 106 into bit map image.

The scanner I/F 212 transmits image data output from the scanner 103 to the scanner image processing unit 300 of the main controller 101. The scanner image processing unit 300 executes image processing such as color space conversion processing and filter processing on the image data received from the scanner 103 via the scanner I/F 212. The printer I/F 213 transmits image data output from the printer image processing unit 400 of the main controller 101 to the printer 104. The printer image processing unit 400 executes image processing such as color space conversion processing, filter processing, and gamma correction processing on the image data output to the printer 104 via the printer I/F 213.

The image rotation unit 214 executes processing of rotating image data. The image compression unit 215 executes compression/decompression processing on various image data. More specifically, the image compression unit 215 executes compression/decompression processing on multi-level image data using a Joint Photographic Experts Group (JPEG) method, and executes compression/decompression processing on binary image data using a method such as Joint Bi-Level Image Experts Group (JBIG) method, Modified Read (MMR) method, or Modified Huffman (MH) method.

The power control unit 216 executes power control of the image forming apparatus 100 based on a control signal received from the operation unit 102, the CPU 201, and the LAN I/F 206. The power control unit 216 executes power control to cause the image forming apparatus 100 to operate in at least a normal power mode or a power saving mode. The normal power mode refers to a state where power is supplied to respective blocks of the image forming apparatus 100, so that an operation such as printing can be executed according to a received job input thereto. The power saving mode refers to a state where power supplied to predetermined blocks in the image forming apparatus 100 is shut off, so that power consumption is lower than that of the normal power mode.

The above-described predetermined blocks refer to the printer image processing unit 400, the RIP 211, and the CPU 201 necessary for executing a printing operation, and the scanner image processing unit 300, the image compression unit 215, and the CPU 201 necessary for executing a reading operation. In the power saving mode, power is supplied to a part of the LAN I/F 206, the power control unit 216, the DRAM 202, and the operation unit 102 for receiving a job from the PC 105, whereas power supplied to the other blocks is shut off.

Figure 3:
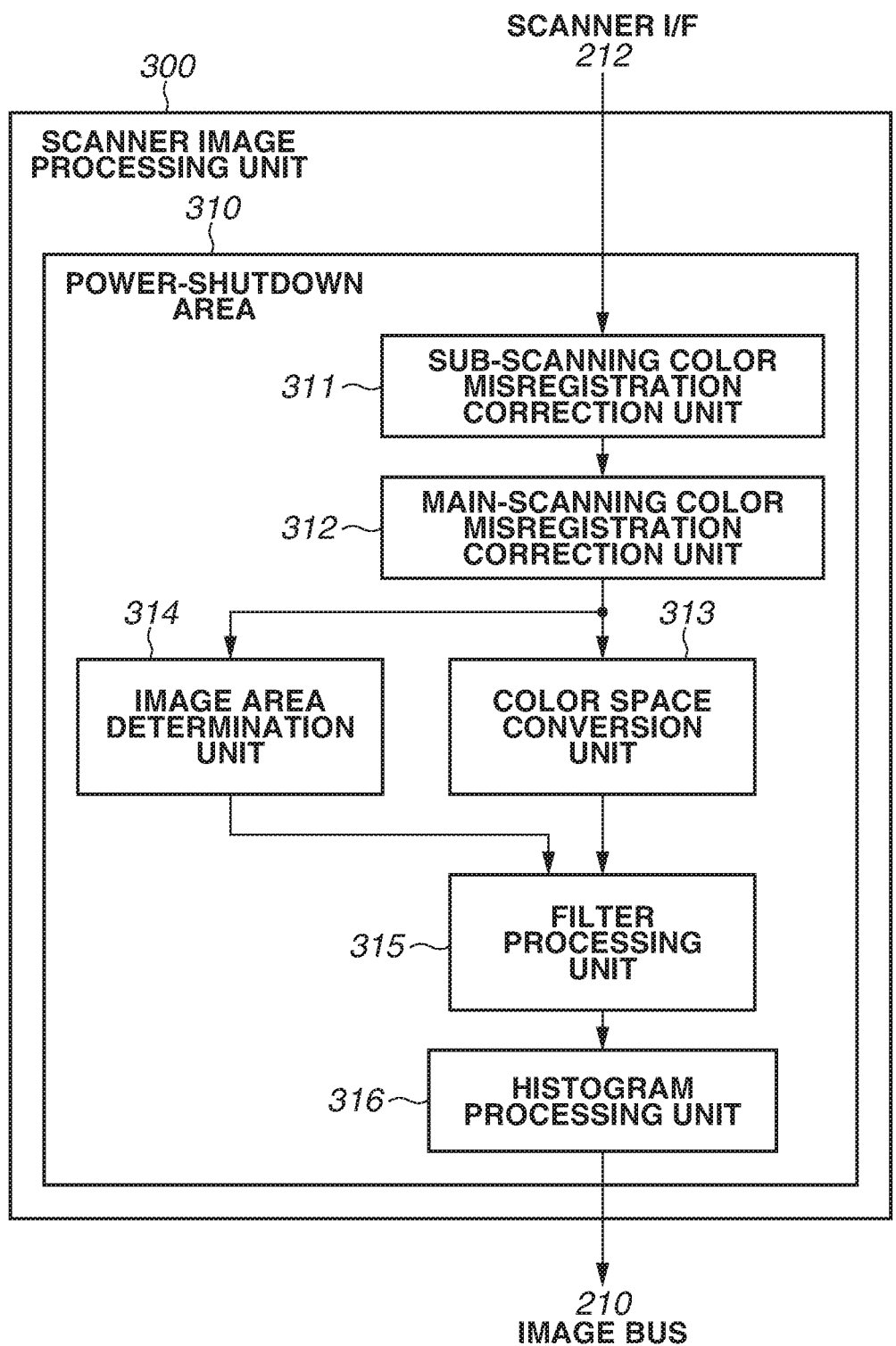
FIG. 3 is a block diagram illustrating a detailed configuration of a scanner image processing unit according to the first exemplary embodiment.

FIG. 3 is a functional block diagram of the scanner image processing unit 300. The scanner image processing unit 300 according to the present exemplary embodiment includes an image processing module group for executing image processing on image data read by the scanner 103 operated by the image forming apparatus 100. For example, the scanner image processing unit 300 is mounted on a semiconductor integrated circuit such as an ASIC, and the semiconductor integrated circuit includes a logic circuit for executing calculation necessary for image processing and an SRAM circuit used as a data storage area.

A sub-scanning color misregistration correction unit 311 is an image processing module that corrects color misregistration in a sub-scanning direction of image data input from the scanner 103. For example, the sub-scanning color misregistration correction unit 311 executes a matrix operation on 8-bit pixel data of respective RGB colors of image data by using a filter having a size of 1-by-3 pixels setting a target pixel as a center. The sub-scanning color misregistration correction unit 311 executes matrix operation on the image data by scanning target pixels one by one in a main scanning direction. At this time, according to the scanning operation of the target pixels, the sub-scanning color misregistration correction unit 311 stores pixel data continuously arrayed in a main-scanning direction in the line buffer SRAM. A main-scanning color misregistration correction unit 312 is an image processing module that corrects color misregistration in the main-scanning direction of the image data. For example, the main-scanning color misregistration correction unit 312 executes a matrix operation on 8-bit pixel data of respective RGB colors of image data by using a filter having a size of 5-by-1 pixels setting a target pixel as a center.

A color space conversion unit 313 is an image processing module for converting the image data that depends on the characteristics of the scanner 103 into device-independent color space image data. In the present exemplary embodiment, the color space conversion unit 313 refers to a below-described look-up table (hereinafter, referred to as "LUT") stored in the SRAM, and converts image data that depends on the characteristics of the scanner 103 into device-independent color space image data. Further, the color space conversion unit 313 includes an SRAM (described below) for temporarily storing image data on which the above-described color space conversion processing has been executed. This SRAM is used as a delay buffer for inputting pixel data of a same position to the filter processing unit 315 in the succeeding stage in concurrence with the attribute flag data output from the image area determination unit 314. This SRAM is provided because image area determination processing executed by the image area determination unit 314 has processing steps greater than that of image processing executed by the color space conversion unit 313 in terms of hardware. A configuration of the color space conversion unit 313 will be described below in detail.

The image area determination unit 314 is an image processing module for determining whether a target pixel in the image data is included in a text portion, a photograph portion, a chromatic color portion, or an achromatic color portion thereof, and generating, for each pixel, attribute flag data indicating the corresponding portion. The filter processing unit 315 is an image processing module for correcting image data to image data having a desired spatial frequency characteristic. The filter processing unit 315 executes a matrix operation on 8-bit pixel data of respective RGB colors of image data by using a filter having a size of 5-by-5 pixels around a target pixel as a center. A histogram processing unit 316 is an image processing module for creating a distribution from the pixel data constituting the image data, and executing further correction on the image data by changing the created distribution.

In addition, the above-described processing executed by the scanner image processing unit 300 is not limited to the processing executed by respective blocks ranging from the sub-scanning color misregistration correction unit 311 to the histogram processing unit 316, and a functional block that executes image processing of another type may be also included. Further, a part of the processing executed by the respective blocks ranging from the sub-scanning color misregistration correction unit 311 to the histogram processing unit 316 may be omitted. Further, the order of the processing executed by blocks ranging from the sub-scanning color misregistration correction unit 311 to the histogram processing unit 316 is not limited to the order described above.

Figure 4:
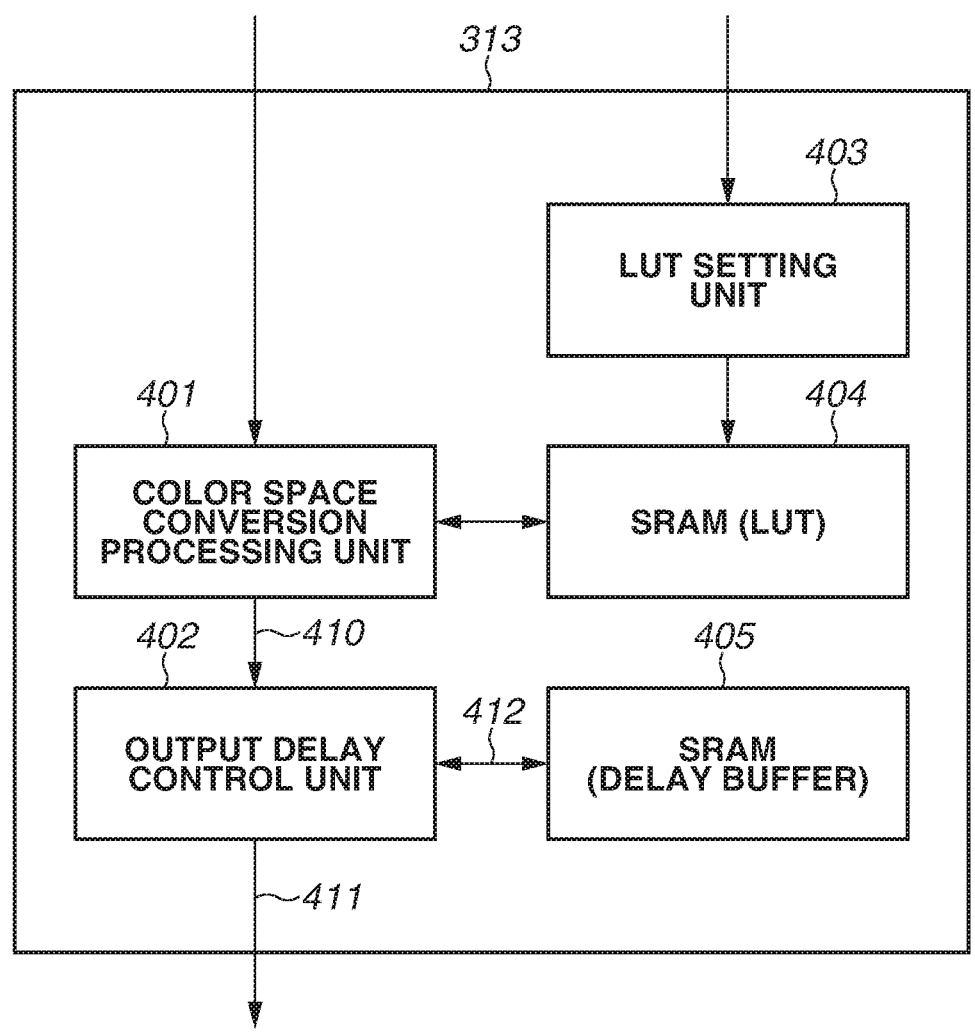
FIG. 4 is a block diagram illustrating a detailed configuration of a color space conversion unit according to the first exemplary embodiment.

FIG. 4 is a block diagram illustrating a detail of the color space conversion unit 313. A color space conversion processing unit 401 is a logic unit for converting received RGB pixels into device-independent sRGB pixels. The color space conversion processing unit 401 is connected to the SRAM 404, and executes the above-described color space conversion processing based on the LUT information set by the CPU 201 to the SRAM 404 via an LUT setting unit 403. In order to allow the filter processing unit 315 in the succeeding stage to execute image processing, the output delay control unit 402 temporarily saves the pixel data processed by the color space conversion processing unit 401 in the SRAM 405 to control a delay amount to adjust an output timing with that of the image area determination data output from the image area determination unit 314 operating in parallel therewith.

Figure 5A:
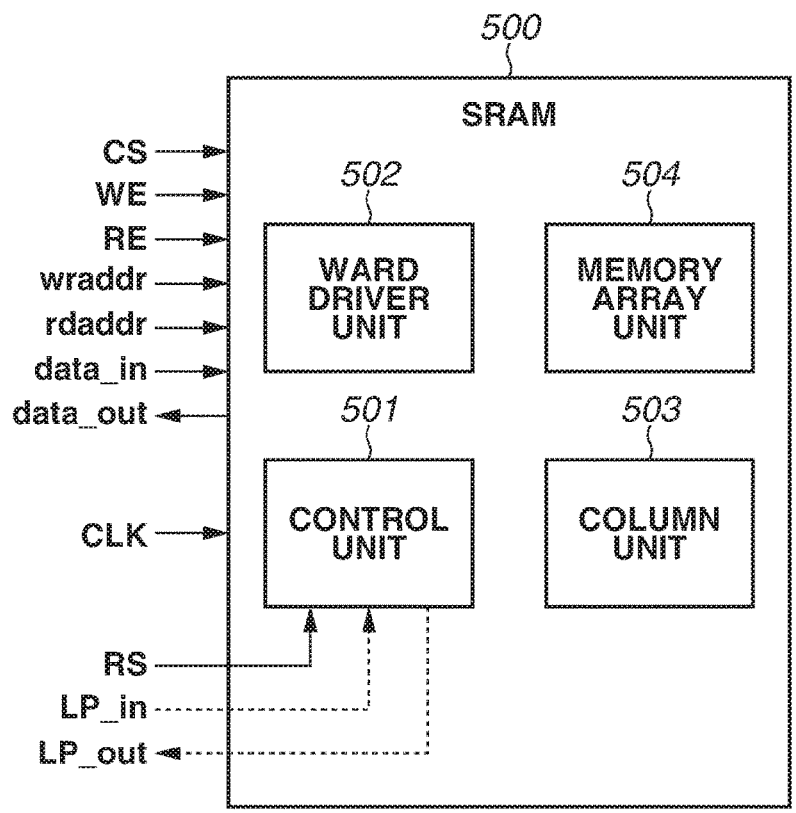
FIGS. 5A, 5B, 5C, and 5D are block diagrams illustrating a detailed configuration of a static random access memory (SRAM) used in the first exemplary embodiment.
Figure 5B:
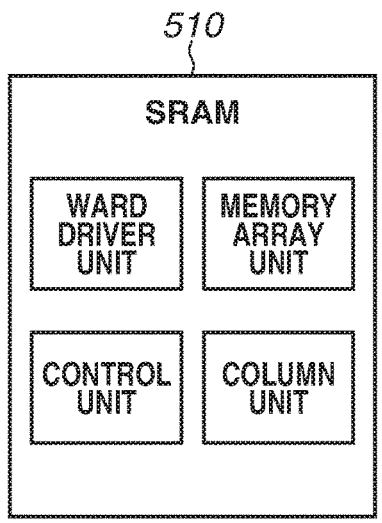
Figure 5C:
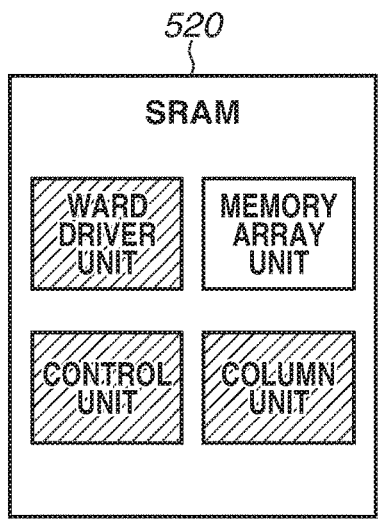
Figure 5D:
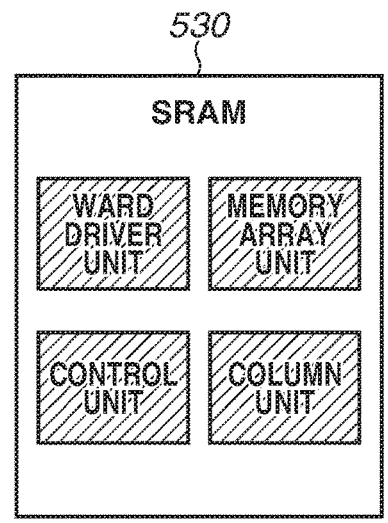

FIG. 5A is a block diagram illustrating a detailed configuration of an SRAM 500 in the present exemplary embodiment, and FIGS. 5B, 5C, and 5D are diagrams illustrating three power modes included in the SRAM 500. In the present exemplary embodiment, an SRAM having a configuration similar to that of the SRAM 500 is used as the above-described SRAM 405. Further, a two-port SRAM with which read access and write access are simultaneously executable is used as the SRAM 500.

As illustrated in FIG. 5A, signals of a plurality of types are input to the SRAM 500. Similar to the signals used for general memory control, a CS signal, a WE signal, and an RE signal are input signals for controlling an operation timing of the SRAM 500. Similar to the signals used for general memory control, a wraddr signal, an rdaddr signal, a data_in signal, and a CLK signal are input signals used for write/read address control, input data control, and clock control. An LP_in signal is an input signal output from the output delay control unit 402, and controls shifting from the normal power mode to the RS mode or the SD mode, or returning from the power saving mode to the normal power mode. The RS signal is an input signal for selecting between the RS mode and the SD mode when the LP_in signal causes the normal mode to shift to the power saving mode. The normal mode shifts to the RS mode when the RS signal is "High", and shifts to the SD mode when the RS signal is "Low".

Further, as illustrated in FIG. 5A, signals of a plurality of types are output from the SRAM 500. Similar to the signal used for general memory control, a data_out signal is an output signal used for controlling output data. An LP_out signal is a signal output to the output delay control unit 402, and indicates that the SRAM 500 has been shifted to the RS mode or the SD mode, or returned to the normal power mode.

A control unit 501 includes a timing control circuit for generating an operation timing signal from the CS signal and the WE signal. Further, the control unit 501 controls supply and shutdown of power with respect to a ward driver unit 502, a column unit 503, and a memory array unit 504 according to the LP_in signal. The control unit 501 includes a circuit for selectively turning off the power supplied to the ward driver unit 502, the column unit 503, and the memory array unit 504. The control unit 501 executes power control of the ward driver unit 502, the column unit 503, and the memory array unit 504 according to the LP_in signal, and delays the LP_in signal to output it as an LP_out signal. The ward driver unit 502 and the column unit 503 serve as read/write units for writing and reading data to/from the memory array unit 504, and the control unit 501 controls the ward driver unit 502 and the column unit 503.

Now, two power saving modes, i.e., an RS mode 520 and an SD mode 530, of the SRAM 500 will be described. In the RS mode, power saving is executed while data in the memory array unit 504 is held. When the RS signal becomes "High", as illustrated in the shaded portions in FIG. 5C, the control unit 501 shuts off the power supplied to the ward driver unit 502 and the column unit 503. At this time, the control unit 501 does not turn off the power supplied to the memory array unit 504.

On the other hand, the SD mode can save power more than the RS mode can although data in the memory array unit 504 will be lost. When the RS signal becomes "Low", as illustrated in the shaded portions in FIG. 5D, the control unit 501 also shuts off the power supplied to the memory array unit 504 in addition to the ward driver unit 502 and the column unit 503. Further, the SRAM 500 operates in the normal mode 510 as illustrated in FIG. 5B when the SRAM 500 is not shifted to any one of the two power saving modes.

In addition, in FIGS. 5C and 5D, power supplied to a part of the modules in the control unit 501 is stopped. The control unit 501 internally includes a power control portion for executing power control for modules within the SRAM 500 and a transfer control portion for executing control of data transfer. In FIGS. 5C and 5D, power supplied to the power control portion is not stopped although power supplied to the transfer control portion is stopped.

The ward driver unit 502 illustrated in FIG. 5A is a function block for decoding the addr signal to determine which row to activate in the memory array unit 504. The control unit 501 shuts off the power supplied to the ward driver unit 502 in the RS mode and the SD mode. The column unit 503 is a functional block for decoding the addr signal to determine which column to activate in the memory array unit 504. The control unit 501 shuts off the power supplied to the column unit 503 in the RS mode and the SD mode.

In the present exemplary embodiment, when the SRAM 500 is to shift to the RS mode, power supplied to the ward driver unit 502 or the column unit 503 is shut off without overlapping with the oscillation of the clock signal, so that voltage fluctuation in the memory array unit 504 can be suppressed. The control unit 501, the ward driver unit 502, and the column unit 503 described above can be said to be control areas for writing data into the memory array unit 504.

The memory array unit 504 includes static memory cells arrayed in a matrix state. The memory array unit 504 holds data in a memory cell determined by the ward driver unit 502 and the column unit 503. The memory array unit 504 is also supplied with power in the RS mode in addition to the normal mode. With this configuration, the memory array unit 504 can hold data in the RS mode. On the other hand, in the SD mode, data will be lost because the control unit 501 shuts off the power supplied to the memory array unit 504. The above-described memory array unit 504 can be said to be a storage area that stores image data for executing image processing.

The power control unit 216 of the present exemplary embodiment can execute power control of the power-shutdown area 310 in FIG. 3. With this configuration, power consumption of the scanner image processing unit 300 can be suppressed when the scanner image processing unit 300 is not used. However, if a wide range of shutdown or supply of power is executed at one time, fluctuation may arise in power supplied to other domains in a periphery thereof. Therefore, in general, control of supplying or shutting down the power is sequentially executed by further dividing the power-shutdown area 310 into small domains, so that time order of microsecond (μs) to millisecond (ms) is required for shifting the power-shutdown area 310 between a power-shutdown state and a power-supply state.

On the other hand, when image processing of image data output from the scanner 103 is executed, image processing is executed by respective processing units of the scanner image processing unit 300. Therefore, it is necessary to maintain power supplied to the power-shutdown area 310. However, in terms of the respective image processing units within the scanner image processing unit 300, idle time period in which image processing is not executed may exist in a time unit of nanosecond (ns) order to microsecond (μs) order. For example, if a size of an image read by the scanner 103 is small, an invalid data period between lines may be included considerably in the image data transmitted from the scanner I/F 212. By making use of the SRAM 500 having the RS mode and the SD mode with respect to the idle time of small time units, power consumption can be also reduced when the scanner image processing unit 300 is operating.

In other words, the SRAM 500 is shifted to the normal mode when the output delay control unit 402 of the color space conversion unit 313 is accessing the SRAM 500, and shifted to either the RS mode or the SD mode in the non-access period. In the non-access period, the output delay control unit 402 shifts the SRAM 500 to the RS mode if data has to be held in the SRAM 500. Then, the output delay control unit 402 controls the RS signal to cause the SRAM 500 to shift to the SD mode if data does not have to be held in the SRAM 500. In this way, the SRAM 500 can be adaptively switched between the normal mode, the RS mode, and the SD mode.

A method of adaptively switching the SRAM 500 between the normal mode, the RS mode, and the SD mode will be described in detail with reference to the flowchart in FIG. 6 and the timing charts in FIGS. 7A and 7B.

Figure 6:
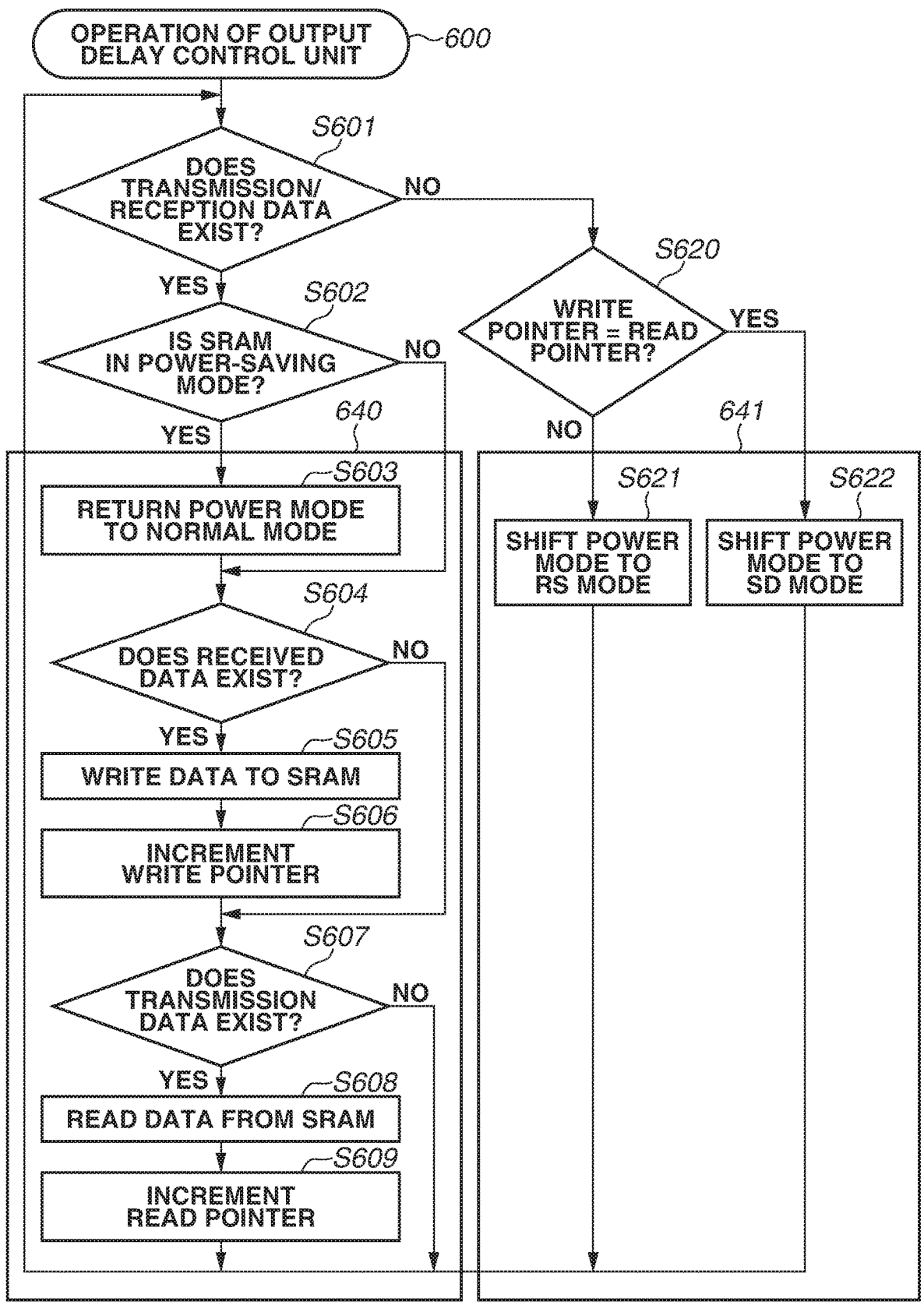
FIG. 6 is a flowchart illustrating control of an SRAM executed by an output delay control unit according to the first exemplary embodiment.
Figure 7A:
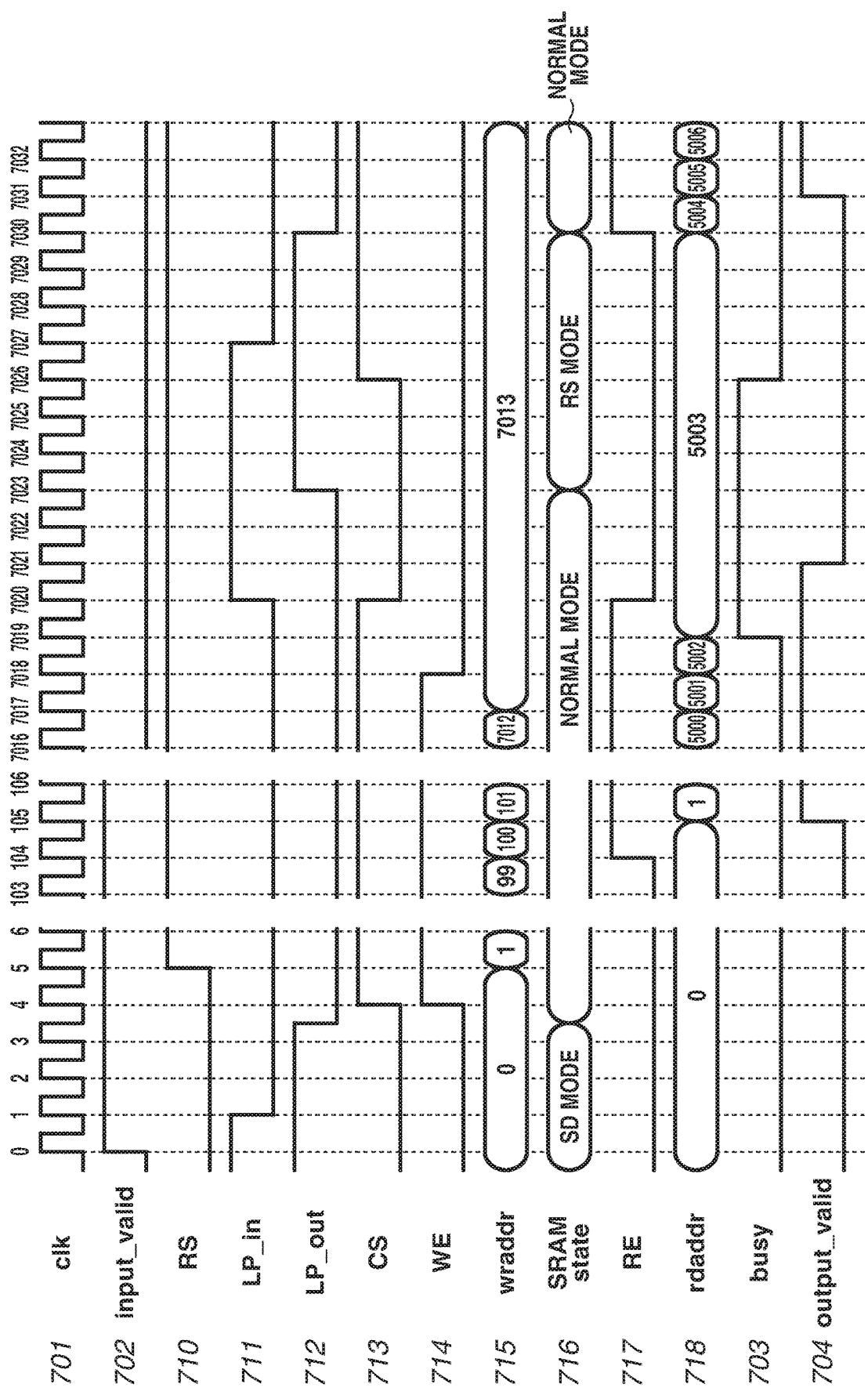

FIG. 6 is a flowchart 600 illustrating the operation of the output delay control unit 402. FIGS. 7A and 7B are timing charts illustrating operation of the output delay control unit 402. In FIGS. 7A and 7B, "clk 701" is a clock used by the output delay control unit 402, the SRAM 500, and the I/Fs 410 and 411 between the modules in the preceding and succeeding stages. A signal "input_valid 702" is a signal included in the image bus 410, and indicates whether image data transmitted from the preceding module of the output delay control unit 402 is valid. A signal "busy 703" is a signal indicating whether the succeeding module of the output delay control unit 402 is ready to receive data. Further, a signal "output_valid 704" is a signal indicating whether image data transmitted to the module in the succeeding stage of the output delay control unit 402 is valid. The output_valid 704 and the busy 703 are included in the image bus 411. Respective signals such as "RS 710", "LP_in 711", "LP_out 712", "CS 713", "WE 714", "wraddr 715", "RE 717", and "rdaddr 718" are included in the SRAM I/F 412 serving as the interface of the SRAM 500 illustrated in FIG. 5. Then, "SRAMstate 716" indicates a power mode of the SRAM 500 at each clock timing. Hereinafter, unless otherwise specified, respective signal names represents timings of signals in the timing chart in FIG. 7A or 7B, and descriptions such as "CLK XXX" and "CLK XXX to YYY" (XXX and YYY are integers) represent clock timings in FIG. 7A or 7B. Further, CLK 0 to 7032 are clock timings in the timing chart in FIG. 7A, and from CLK 10000 and after are clock timings in the timing chart in FIG. 7B.

Referring back to the description of the flowchart in FIG. 6, in step S601, the output delay control unit 402 checks whether transmission/reception data exists. This can be determined based on whether the input_valid 702 is "High", whether the RE 717 is "High", or whether the busy 703 is "High". For example, this condition is satisfied when the input_valid 702 is "High" as illustrated in the CLK 0 to 106. Further, this condition is also satisfied if a timing of reading out data from the SRAM 500 has come (i.e., the RE 717 becomes "High") when the busy 703 is in a Low period.

If the transmission/reception data exists (YES in step S601), the processing proceeds to step S602. In step S602, the output delay control unit 402 checks whether the SRAM 500 is in the power saving mode. This can be determined based on the LP_out 712. For example, as illustrated in the CLK 0, if the LP_out 712 is "High", the output delay control unit 402 determines that the SRAM 500 is shifted to any one of the power saving modes, i.e., the SD mode and the RS mode (YES in step S602).

If the output delay control unit 402 determines that the SRAM 500 is shifted to the power saving mode (YES in step S602), the processing proceeds to step S603. In step S603, the output delay control unit 402 returns the power mode of the SRAM 500 to the normal mode. For example, as illustrated in the CLK 1 to 4, the output delay control unit 402 negates the LP_in 711 to "Low" with respect to the SRAM 500 and checks if the LP_out 712 from the SRAM 500 is changed to "Low".

On the other hand, in step S602, as illustrated, for example, in the CLK 4 to 7019, if the LP_out 712 is "Low", the output delay control unit 402 determines that the SRAM 500 is in the normal mode (NO in step S602), so that the processing in step S603 is not executed. At this time, the SRAM 500 is shifted to the normal mode and brought into an accessible state.

Next, if data received from the preceding module exists (YES in step S604), the processing proceeds to step S605. In step S605, the output delay control unit 402 writes the received data to the SRAM 500. As illustrated in the CLK 4 and 5, this control is executed similarly with the control of the CS 713, the WE 714, the wraddr 715, or a data_in (not illustrated in FIGS. 7A and 7B) executed in the conventional SRAM. Thereafter, in step S606, the write pointer is incremented. The write pointer is incremented by incrementing an integer value described in a chart of the wraddr 715 one-by-one. On the other hand, if data received from the preceding module does not exist (NO in step S604), the processing in steps S605 and S606 is skipped, and the processing proceeds to step S607.

In step S607, if data to be transmitted to the succeeding module exists (YES in step S607), the processing proceeds to step S608. In step S608, transmission data is read from the SRAM 500. As illustrated in the CLK 104 to 105, this control is executed similarly with the control of the CS 713, the RE 717, the rdaddr 718, or a data_out (not illustrated in FIG. 7A or 7B) executed in the conventional SRAM. Then, in step S608, the read pointer is incremented. The read pointer is incremented by incrementing an integer value described in a chart of the rdaddr 718 one-by-one. On the other hand, if data to be transmitted to the succeeding module does not exist (NO in step S607), the processing in steps S608 and S609 is skipped, and the processing proceeds to step S601. For example, as illustrated in the CLK 7016 to 7017, when the transmission data does not exist, data transmission may be stopped because a busy signal is received from the succeeding module.

The process 640 including steps S603 to S609 illustrates the processing executed when the SRAM 500 operates in the normal mode.

Referring back to the determination in step S601, for example, as illustrated in the CLK 7019 to 7026, with respect to a period in which the input_valid 702 is "Low" whereas the busy 703 is "High", the output delay control unit 402 determines that transmission/reception data does not exist (NO in step S601). If the output delay control unit 402 determines that the transmission/reception data does not exist (NO in step S601), the processing proceeds to step S620. In step S620, the output delay control unit 402 determines whether data written into the SRAM 500 includes unread data. More specifically, in step S620, the output delay control unit 402 determines whether both of the write pointer and the read pointer indicate a same position. For example, as illustrated in the CLK 7019 to 7026, if the write pointer and the read pointer indicate different positions (NO in step S620), data written into the SRAM 500 remains in the SRAM 500 as unsent data. Therefore, the output delay control unit 402 can determine that data to be held exists in the SRAM 500, and the processing proceeds to step S621. In this case, in step S621, the output delay control unit 402 controls the power mode of the SRAM 500 to shift to the RS mode in which power can be saved while holding data. More specifically, as illustrated in the CLK 7020 to 7023, the output delay control unit 402 asserts the LP_in 711 to bring the signal level to "High" while maintaining the RS 710 to "High", and checks whether the LP_out 712 from the SRAM 500 is changed to "High".

On the other hand, for example, as illustrated in the CLK 10003 to 10011, if both of the write pointer and the read pointer indicate the same position (YES in step S620), this indicates a state where all of data written into the SRAM 500 has been read and transmitted to the succeeding module. Thus, unsent data does not remain in the SRAM 500. Therefore, the output delay control unit 402 can determine that data to be held does not exist in the SRAM 500 (YES in step S620), and the processing proceeds to step S622. Then, in step S622, the output delay control unit 402 controls the power mode of the SRAM 500 to shift to the SD mode in which power can be saved without holding data. More specifically, as illustrated in the CLK 10003 to 10006, the output delay control unit 402 asserts the LP_in 711 to bring the signal level to "High" while maintaining the RS 710 to "Low", and checks whether the LP_out 712 from the SRAM 500 is changed to "High".

The process 641 including steps S621 and S622 illustrates the processing executed when the SRAM 500 is to shift to any one of the power saving modes, i.e., the RS mode and the SD mode.

As describe above, in the present exemplary embodiment, when data necessary to be held is stored in the SRAM 500, the output delay control unit 402 of the color space conversion unit 313 shifts the SRAM 500 to the RS mode as a power saving mode for the idling period. Then, when data necessary to be held is not stored in the SRAM 500, the output delay control unit 402 controls the SRAM 500 to shift to the SD mode as a power saving mode for the idling period. In this way, power control of the SRAM 500 can be executed adaptively when image processing is executed, so that power saving control can be realized more effectively when the image processing module is operated.

In the first exemplary embodiment, the output delay control unit 402 selects which power saving mode the SRAM is to shift based on the information about the write pointer and the read pointer with respect to the SRAM.

However, shift control of the power saving mode is not limited thereto. In a second exemplary embodiment, another method of shifting the SRAM 405 between two power saving modes will be described. In the present exemplary embodiment, the SRAM 405 is switched between the SD mode and the RS mode according to the state of the image forming apparatus 100.

Figure 8:
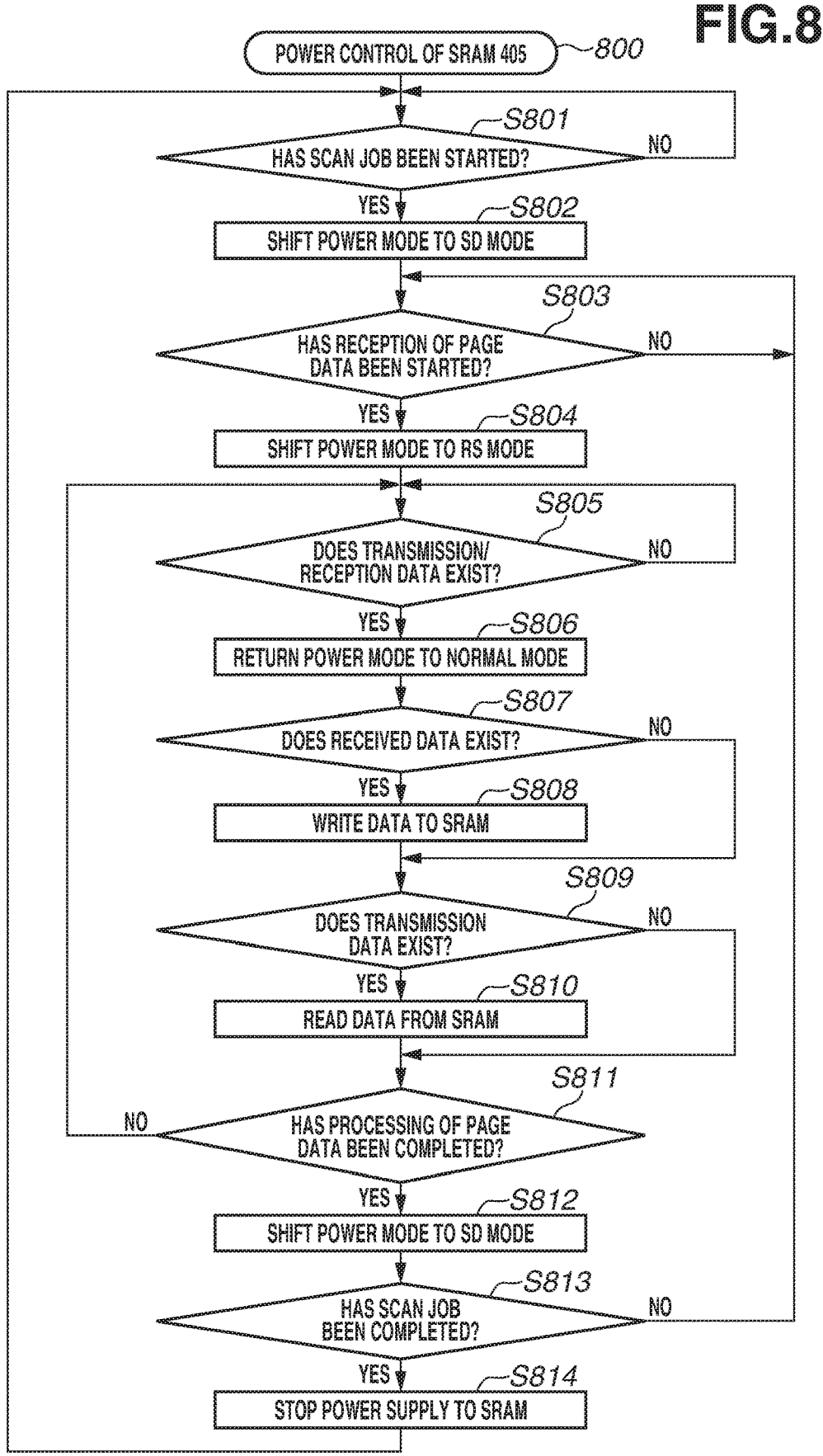
FIG. 8 is a flowchart illustrating processing executed by an output delay control unit according to a second exemplary embodiment.
Figure 9:
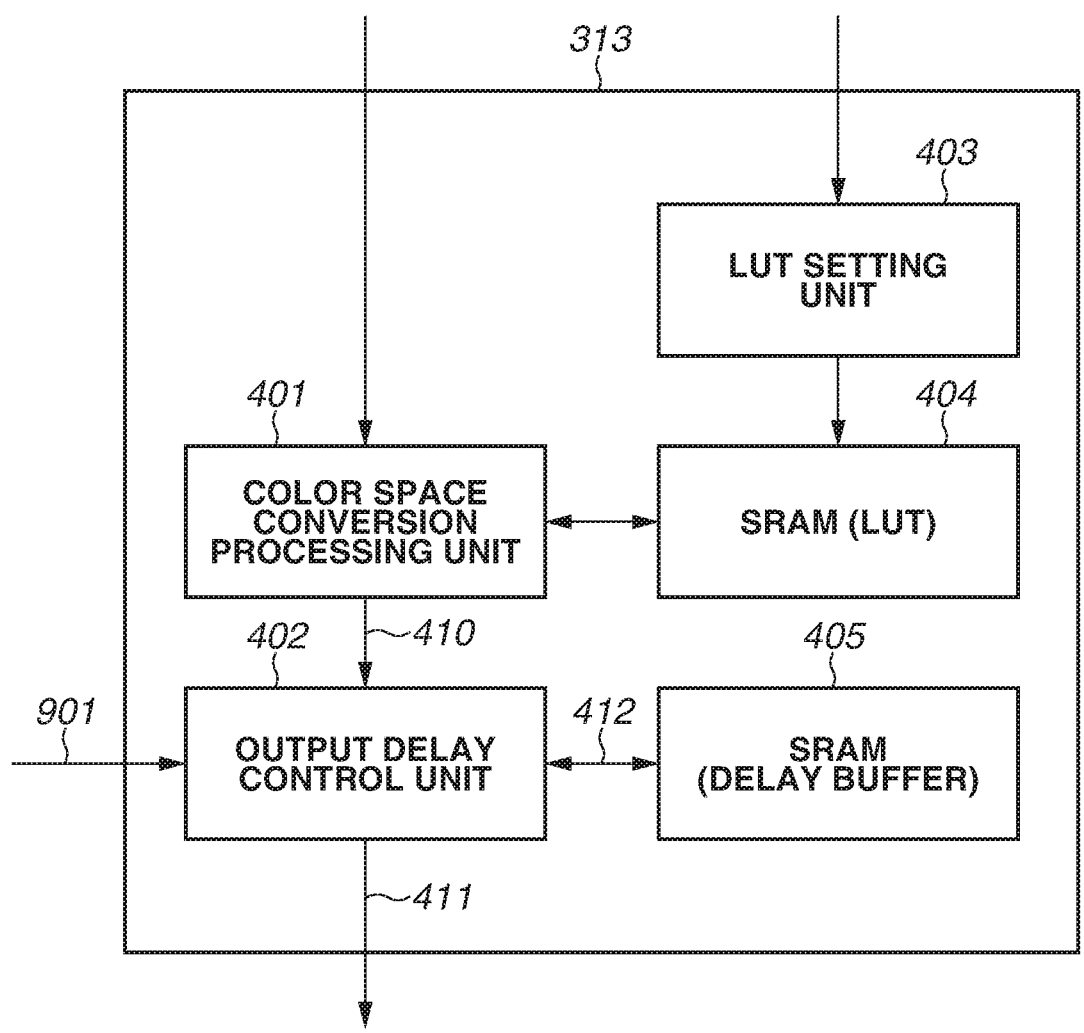
FIG. 9 is a block diagram illustrating a detailed configuration of a color space conversion unit according to the second exemplary embodiment.

FIG. 8 is a flowchart illustrating a power control flow of the SRAM 405 according to the present exemplary embodiment. The processing illustrated in FIG. 8 is executed by the output delay control unit 402. Further, FIG. 9 is a block diagram illustrating details of the color space conversion unit 313 of the present exemplary embodiment. In the present exemplary embodiment, a signal line 901 that connects the power control unit 216 and the output delay control unit 402 in the color space conversion unit 313 is arranged.

In the present exemplary embodiment, although it is assumed that the output delay control unit 402 executes the following processing, control of the following processing may be executed by the CPU 201.

In the present exemplary embodiment, it is assumed that power is not supplied to the power-shutdown area 310 of the scanner image processing unit 300 when the image forming apparatus 100 is in the stand-by state and does not execute a job.

In step S801, the output delay control unit 402 determines whether start of a scan job is notified after power is supplied to the power-shutdown area 310 of the scanner image processing unit 300. When start of the scan job is instructed, the CPU 201 controls the power control unit 216 to start power supply to the power-shutdown area 310 of the scanner image processing unit 300. Then, the CPU 201 controls the power control unit 216 to output a signal indicating start of the scan job to the signal line 901. Based on the signal received via the signal line 901, the output delay control unit 402 determines that start of the scan job is instructed. If the output delay control unit 402 determines that start of the scan job is not instructed (NO in step S801), the output delay control unit 402 does not advance the processing from step S801 and executes the processing described in step S801.

If the scan job is input to the image forming apparatus 100 (YES in step S801), the processing proceeds to step S802. In step S802, the output delay control unit 402 shifts the power mode of the SRAM 405 to the SD mode. When the scan job is input thereto, the CPU 201 supplies power to the SRAM 405. Then, the output delay control unit 402 sets the RS 710 to "Low" and the LP_in 711 to "High", and shifts the SRAM 405 to the SD mode.

Subsequently, in step S803, after executing parameter setting of the scanner image processing unit 300, the output delay control unit 402 determines whether start of reception of page data from the scanner 103 is notified. The CPU 201 detects reception of page data from the scanner 103, and controls the power control unit 216 to output a signal indicating start of reception of page data to the signal line 901. Based on the signal received via the signal line 901, the output delay control unit 402 detects reception of the page data. If reception of page data has not been started (NO in step S803), the output delay control unit 402 does not advance the processing but waits until reception of page data is started.

If reception of page data is started (YES in step S803), the processing proceeds to step S804. In step S804, the output delay control unit 402 shifts the power mode of the SRAM 405 to the RS mode. There is a time lag between start of reception of page data and actual input of effective data with respect to the color space conversion unit 313. Therefore, the output delay control unit 402 shifts the SRAM 405 to the RS mode instead of shifting the SRAM 405 to the normal mode immediately after reception of page data is started. In step S804, the output delay control unit 402 sets the RS 710 and the LP_in 711 to "High" and shifts the SRAM 405 to the RS mode.

Next, in step S805, the output delay control unit 402 determines whether transmission/reception data with respect to the own module exists. In other words, the output delay control unit 402 determines whether it is necessary to access data stored in the SRAM 405. The processing in step S805 is similar to the processing described in step S601. If transmission/reception data does not exist (NO in step S805), the output delay control unit 402 does not advance the processing but executes the processing of step S805.

If transmission/reception data with respect to the own module exists (YES in step S805), the processing proceeds to step S806. In step S806, the output delay control unit 402 returns the SRAM 405 to the normal mode from the RS mode. The output delay control unit 402 sets the RS 710 to "Low" and shifts the SRAM 405 to the normal mode.

Then, in step S807, the output delay control unit 402 determines whether transmission/reception data is received data. If the access to the output delay control unit 402 is reception of data (YES in step S807), the processing proceeds to step S808. In step S808, the output delay control unit 402 writes the received data in the SRAM 405. In step S807, if access to the output delay control unit 402 is not reception of data (NO in step S807), the processing proceeds to step S809 described below.

In step S809, the output delay control unit 402 determines whether access to the output delay control unit 402 is access for reading out transmission data.

If access to the output delay control unit 402 is access for reading out transmission data (YES in step S809), the processing proceeds to step S810. In step S810, the output delay control unit 402 reads transmission data from the SRAM 405. In step S809, if access to the output delay control unit 402 is not access for reading out transmission data (NO in step S809), the processing proceeds to step S811 described below.

In step S811, the output delay control unit 402 determines whether processing of data for one page has been completed. If processing of data for one page has not been completed (NO in step S811), the processing returns to step S805. If processing of data for one page has been completed (YES in step S811), the processing proceeds to step S812. In step S812, the output delay control unit 402 shifts the power mode of the SRAM 405 to the SD mode. In a case where processing of data for one page has been completed, all of data written into the memory array of the SRAM 405 has been read and transmitted to the next module. Therefore, the output delay control unit 402 can reduce the power consumption of the SRAM 405 by shifting the SRAM 405 to the SD mode. In addition, completion of data processing for one page is determined based on information about image size for one page previously set to the output delay control unit 402 or the color space conversion unit 313 as a higher-order module and a number of data transmitted/received by the output delay control unit 402.

After processing of the page data is completed, the power mode of the SRAM 405 is changed to the SD mode. Then, in step S813, the output delay control unit 402 determines whether scan job has been completed. In other words, the output delay control unit 402 determines whether there is page data to be processed next. If page data to be processed next is received (NO in step S813), the processing returns to step S803. If page data to be processed next does not exist (Yes in step S813), the processing proceeds to step S814. In step S814, the power delay control unit 402 stops the power supplied to the SRAM 405. At this time, power supplied to the power-shutdown area 310 is also stopped after the power supplied to the SRAM 405 is stopped. Then, the processing returns to step S801.

In the present exemplary embodiment, after the color space conversion unit 313 starts receiving data, the SRAM 405 operates in the normal mode. However, the SRAM 405 may shift to the RS mode in a period when the color space conversion unit 313 does not receive effective data in the processing of data for one page. For example, when the processing of page data has not been completed in step S811, the output delay control unit 402 returns the processing to step S805. Then, if transmission/reception data is not received, the output delay control unit 402 may shift the SRAM 405 to the RS mode. In this case, the output delay control unit 402 shifts the SRAM 405 to the normal mode when data to be processed is input to the color space conversion unit 313.

In the above-described exemplary embodiment, the SRAM 405 is shifted to the SD mode when supply of power is started and processing of page data is completed. As described above, the SRAM 405 is shifted to the SD mode at a timing when unread data is not stored. In other words, the SRAM 405 is shifted to the SD mode at a timing when data stored in the SRAM 405 can be deleted without any problem.

Further, in the present exemplary embodiment, when scan job is not executed, power supplied to the scanner image processing unit 300 is shut off, and power supplied to the power-shutdown area 310 is stopped. However, the power state of the scanner image processing unit 300 when the scan job is not executed is not limited thereto. For example, when the scan job is not executed, the scanner image processing unit 300 may be turned on, and power may be supplied to the power-shutdown area 310. At this time, by setting the SRAM 405 to the SD mode, it is possible to shorten the time taken for starting a scanning operation at the time of receiving a scan job while reducing the power consumption of the SRAM 405.

In the first and the second exemplary embodiments, the case in which a job is executed while the power mode of the SRAM 405 is shifted between the normal mode, the RS mode, and the SD mode has been described. In a third exemplary embodiment, a power state of an SRAM 404 is switched between the normal mode, the RS mode, and the SD mode according to the power state of the image forming apparatus 100. By switching the power state of the SRAM 404 according to the power state of the image forming apparatus 100, the power consumption of the SRAM 404 can be suppressed without stopping the power supply to the SRAM 404 when the image forming apparatus 100 is operating in the power saving mode.

Further, in the first and the second exemplary embodiment, the case in which the power saving mode of the SRAM 405 operating as a buffer used for line processing of a scan image is switched between the RS mode and the SD mode has been described. In the present exemplary embodiment, the power saving mode of the SRAM 404 for storing a parameter or an LUT used for image processing is switched between the RS mode and the SD mode.

FIG. 10 is a table illustrating power modes of the image forming apparatus 100 according to the present exemplary embodiment and power supply states of the main controller 101, the operation unit 102, the scanner 103, and the printer 104 at each of the power modes. In FIG. 10, "ON" represents a state where power is supplied, whereas "OFF" represents a state where power is not supplied.

In the present exemplary embodiment, the power mode of the image forming apparatus 100 is roughly divided into two modes, i.e., a stand-by mode and a sleep mode. In the stand-by mode, power is supplied to all of the main controller 101, the operation unit 102, the scanner 103, and the printer 104. Further, the stand-by mode is a power state at the time of job execution.

In the sleep mode, power supplied to the scanner 103 and the printer 104 is shut off. The image forming apparatus 100 is shifted to the sleep mode when a job is not executed or a user operation on the operation unit 102 is not performed for a certain period of time in the stand-by mode.

In FIG. 10, under the power state of the main controller 101 in the table, a power mode of the SRAM 404 in the power state is illustrated. In the present exemplary embodiment, when the image forming apparatus 100 is in the stand-by mode, the SRAM 404 operates in the RS mode or the normal mode. For example, when the image forming apparatus 100 is activated, the SRAM 404 is set to the RS mode. Then, when the image forming apparatus 100 receives a job, the SRAM 404 is switched to the normal mode from the RS mode. When the job is being executed, the image forming apparatus 100 is in the stand-by mode, and the SRAM 404 operates in the normal mode. After the image forming apparatus 100 has completed the job, the SRAM 404 is shifted to the RS mode.

Further, at this time, the stand-by mode of the image forming apparatus 100 is maintained for a certain period after completion of the scan job executed in advance. At this time, the SRAM 404 waits in the RS mode. Because the image forming apparatus 100 waits in the stand-by mode after completion of the job, the image forming apparatus 100 can execute a job by using the setting parameters held in the SRAM 404 when the next scan job is executed. With this configuration, it is possible to shorten the time taken for starting the scan job.

When the image forming apparatus 100 is in the sleep mode, the SRAM 404 operates in the SD mode. When the user inputs an instruction for returning the image forming apparatus 100 from the sleep mode, the SRAM 404 is shifted to the RS mode from the SD mode. When the SRAM 404 is shifted to the RS mode from the SD mode, it is necessary to set parameters to the memory array. However, in a case where the image forming apparatus 100 returns to the stand-by mode, it will take time to activate the scanner 103 or the printer 104. Because time taken for activating the printer 104 or the scanner 103 is longer than time taken for setting the parameters to the memory of the SRAM 404, the operation mode of the SRAM 404 can be switched to the RS mode before the image forming apparatus 100 is shifted to the stand-by mode. As described above, in the sleep mode in which data such as the parameters or the LUT stored in the SRAM 404 does not have to be held, a mode of the SRAM 404 is set to the SD mode. In this way, the power consumption of the SRAM 404 in the sleep mode can be lowered.

When the image forming apparatus 100 is further shifted to a deep-sleep mode or a shut-down mode with lower power consumption, the SRAM 404 is shifted to a power-off mode. In the power-off mode, power supplied to the SRAM 404 is stopped, so that the SRAM 404 stops its operation.

By using the SD mode in the sleep mode, it is possible to lower the power consumption of the SRAM 404 in the sleep mode while shortening the time taken for shifting the state of the SRAM 404 when the image forming apparatus 100 is shifted to the stand-by mode from the sleep mode.

Figure 11:
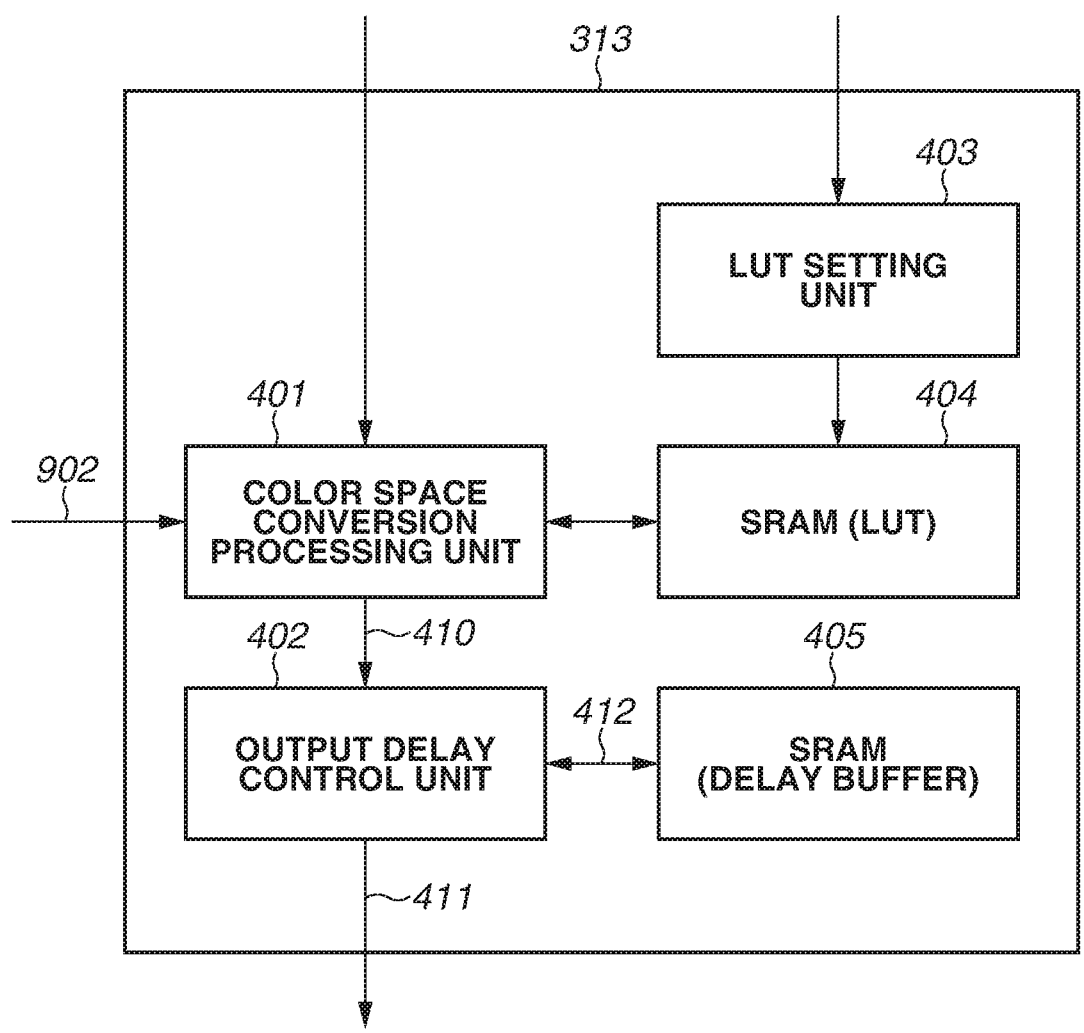
FIG. 11 is a block diagram illustrating a detailed configuration of a color space conversion unit according to the third exemplary embodiment.

FIG. 11 is a block diagram illustrating details of the color space conversion unit 313 in the present exemplary embodiment. The present exemplary embodiment is different from the first and the second exemplary embodiments in that a signal line 902 for connecting the color space conversion processing unit 401 and the power control unit 216 is arranged. The signal line 902 is used when the processing illustrated in FIG. 12 is executed.

Figure 12:
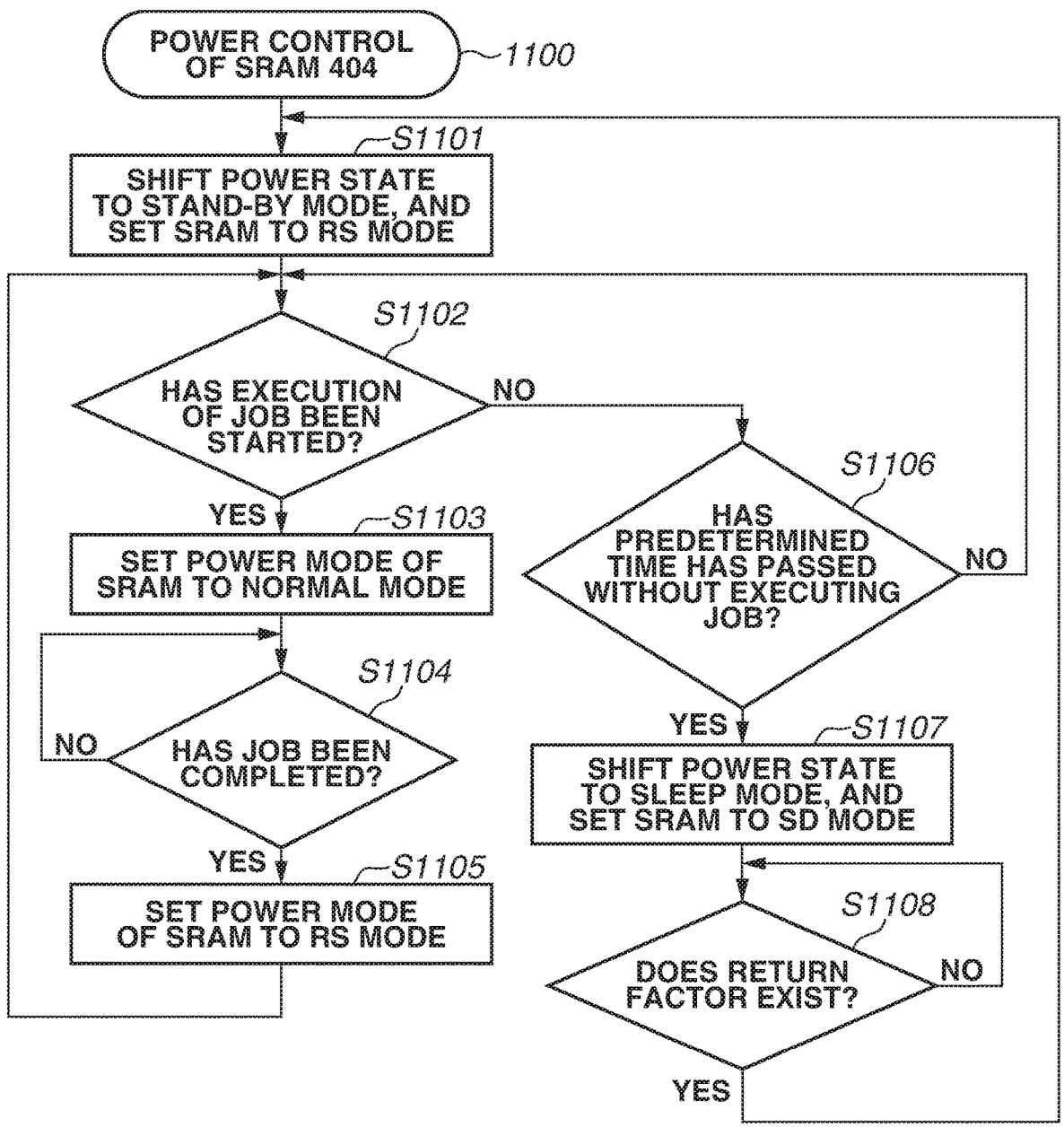
FIG. 12 is a flowchart illustrating shifting processing of an image forming apparatus between a stand-by mode and a sleep mode according to the third exemplary embodiment.

FIG. 12 is a flowchart illustrating the processing executed by the CPU 201 in the present exemplary embodiment. The processing illustrated in FIG. 12 is started when the power of the image forming apparatus 100 is turned on, and repeatedly executed until the power of the image forming apparatus 100 is turned off. Further, in the processing illustrated in FIG. 12, the color space conversion processing unit 401 switches the power mode of the SRAM 404 by using a method similar to the method used when the output delay control unit 402 switches the power mode of the SRAM 405 in the first and the second exemplary embodiments.

First, in step S1101, when the image forming apparatus 100 is activated by receiving power supply, the CPU 201 shifts the power state of the image forming apparatus 100 to the stand-by mode, and controls the color space conversion processing unit 401 to set the power mode of the SRAM 404 to the RS mode. The CPU 201 reads a boot program from the ROM 203 and executes the boot program at the time of activation. In the boot sequence, the CPU 201 turns on the power of the operation unit 102, the scanner 103, and the printer 104 via the power control unit 216. Further, the CPU 201 controls the power control unit 216 to instruct the color space conversion processing unit 401 to shift the SRAM 404 to the RS mode via the signal line 902.

In step S1102, the CPU 201 determines whether execution of a job has been started. For example, the CPU 201 determines that execution of the job has been started when start of the job is instructed through the operation unit 102, or when the job is received via a network interface.

If execution of the job is started (YES in step S1102), the processing proceeds to step S1103. In step S1103, the CPU 201 controls the color space conversion processing unit 401 of the scanner image processing unit 300 to set the power mode of the SRAM 404 to the normal mode. In the present exemplary embodiment, the CPU 201 shifts the SRAM 404 to the normal mode when a job of any type is executed. Similar to the second exemplary embodiment, the power mode of the SRAM 404 may be shifted to the normal mode only when a scan job is executed. The CPU 201 controls the power control unit 216 to instruct the color space conversion processing unit 401 to change the power saving mode of the SRAM 404. The color space conversion processing unit 401 receives the shift instruction via the signal line 902 to control the SRAM 404 to shift to the normal mode.

After shifting the SRAM 404 to the normal mode, the color space conversion processing unit 401 determines whether conversion processing of the LUT used in the color space conversion has occurred, i.e., whether received data exists. If the LUT conversion processing has occurred, the color space conversion processing unit 401 reads a conversion value corresponding to the pixel value of the received data from the SRAM 404. The color space conversion processing unit 401 executes this processing until the job has been completed. In addition, data is not transmitted to the scanner image processing unit 300 when a job other than the scan job is executed. Therefore, the color space conversion processing unit 401 does not execute processing.

In step S1104, the CPU 201 determines whether the job has been completed. If the job has not been completed (NO in step S1104), the CPU 201 does not advance the processing but continuously executes the processing in step S1104. If the job has been completed (YES in step S1104), the processing proceeds to step S1105. In step S1105, the CPU 201 instructs the power control unit 216 to shift the power mode of the SRAM 404 to the RS mode. Based on the instruction from the CPU 201, the power control unit 216 controls the color space conversion processing unit 401 via the signal line 902 to set the power mode of the SRAM 404 to the RS mode.

If execution of the job is not started when the image forming apparatus 100 is in the stand-by mode (NO in step S1102), the processing proceeds to step S1106. In step S1106, the CPU 201 determines whether predetermined time has passed. The predetermined time is a time previously set by the user through the operation unit 102 of the image forming apparatus 100. A state of the image forming apparatus 100 is shifted to the sleep mode from the stand-by mode when the predetermined time has passed without receiving an instruction of job execution. If the predetermined time has not passed (NO in step S1106), the processing returns to step S1102.

If the predetermined time has passed (YES in step S1106), the processing proceeds to step S1107. In step S1107 the CPU 201 shifts the image forming apparatus 100 to the sleep mode, and shifts the SRAM 404 to the SD mode. The CPU 201 controls the power control unit 216 to turn off the power of the scanner 103 and the printer 104. The CPU 201 controls the power control unit 216 to instruct the color space conversion processing unit 401 to shift the SRAM 404 to the SD mode. The power control unit 216 receives the instruction from the CPU 201 and instructs the color space conversion processing unit 401 included in the scanner image processing unit 300 to shift the SRAM 404 to the SD mode. Based on the instruction received via the signal line 902, the color space conversion processing unit 401 shifts the SRAM 404 to the SD mode.

Next, in step S1108, the CPU 201 determines whether there is a return factor that causes the image forming apparatus 100 to return to the stand-by mode from the sleep mode. The return factor may be a predetermined operation executed through the operation unit 102 or a job input from the PC 105 via the LAN 106. If the return factor is not detected (NO in step S1108), the CPU 201 does not advance the processing but executes the processing described in step S1108. If the above-described return factor is detected by the CPU 201 (YES in step S1108), the processing returns to step S1101.

<Other Exemplary Embodiments>

In the above-described exemplary embodiments, the disclosure is applied to an image forming apparatus. However, the disclosure may be applied to an information processing apparatus such as a personal computer.

Further, the memory according to the disclosure can be applied not only to an SRAM but also to another memory such as a dynamic random access memory (DRAM).

Further, in the above-described exemplary embodiments, the SRAM is shifted to the RS mode or the SD mode according to the logic of the RS signal when the LP_in signal is input to the SRAM. A signal indicating the RS mode and a signal indicating the SD mode may be provided separately. In this way, the SRAM is shifted to the RS mode when the signal indicating the RS mode is input thereto, and the SRAM is shifted to the SD mode when the signal indicating the SD mode is input thereto.

Further, the object of the disclosure can be achieved by supplying a storage medium storing a program code of software for implementing the functions of the above-described exemplary embodiments to a system or an apparatus. In this case, a computer (or a CPU or a micro processing unit (MPU)) of the system or the apparatus reads out and executes the program code stored in the storage medium to implement the above-described functions. Further, in this case, the storage medium storing that program code constitutes the disclosure.

For example, a flexible disk, a hard disk, an optical disk, a magneto-optical disk, a compact disc read only memory (CD-ROM), a compact disc recordable (CD-R), a magnetic tape, a non-volatile memory card, or a ROM can be used as a storage medium for supplying the program code.

Further, the disclosure is not limited to the case in which a computer reads and executes a program code to implement the functions of the above-described exemplary embodiments. For example, an operating system (OS) running on the computer may execute all or a part of the actual processing based on the instructions of the program code to implement the functions of the above-described exemplary embodiments through the processing.

Further, the functions of the above-described exemplary embodiments may be implemented after the program code read out from the storage medium is written into a memory included in a function expansion board inserted to the computer or a memory included in a function expansion unit connected to the computer. In other words, after the program code is written into the memory, a CPU included in the function expansion board or the function expansion unit may execute all or a part of the actual processing based on the instructions of the program code and implement the functions of the above-described exemplary embodiment through the processing.

According to an aspect of the embodiments, the power saving mode of the SRAM can be switched and shifted between the second power mode and the third power mode according to a state of the apparatus. Thus, the SRAM is shifted to the SD mode when data does not have to be held and shifted to the RS mode when the data has to be held. Therefore, the power consumption thereof can be suppressed according to the state of the apparatus.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2017-202094, filed Oct. 18, 2017, and No. 2018-149433, filed Aug. 8, 2018, which are hereby incorporated by reference herein in their entirety.

What is claimed is:

1. A control apparatus comprising:
a controller configured to control a static random access memory (SRAM) capable of having a first power mode, a second power mode that is capable of holding data and saving power more than the first power mode, and a third power mode that is not capable of holding data but is capable of saving more power than the second power mode,
wherein the controller is configured to:
provide power to the SRAM to write image data into the SRAM;
write the image data into the powered SRAM while a power mode of the SRAM is the first power mode;
read the written image data from the powered SRAM while the power mode of the SRAM is the first power mode; and
shift the power mode of the powered SRAM from the first power mode to the third power mode based on a determination that all of the written image data has been read from the SRAM.

2. The control apparatus according to claim 1, wherein the controller is further configured to detect data written in the SRAM.

3. The control apparatus according to claim 2, wherein the controller is further configured to:
write data into the SRAM; and
read data from the SRAM,
wherein the controller detects data written in the SRAM and having not been read.

4. The control apparatus according to claim 3, wherein, based on a write pointer indicating a writing position of data written and a read pointer indicating a reading position of data read, the controller detects data that has not been read from among data written in the SRAM.

5. The control apparatus according to claim 4, wherein the controller detects that data that has not been read does not remain in the SRAM in a case where the write pointer and the read pointer indicate a same position, and detects that data that has not been read remains in the SRAM in a case where the write pointer and the read pointer indicate different positions.

6. The control apparatus according to claim 4, wherein the write pointer is incremented when data is written, and the read pointer is incremented when data is read.

7. The control apparatus according to claim 4, wherein the controller outputs an instruction for shifting the SRAM to the second power mode in a case where data that has not been read is stored in the SRAM, and the controller outputs an instruction for shifting the SRAM to the third power mode in a case where all of the data has been read fom the SRAM.

8. The control apparatus according to claim 1, wherein the SRAM is a buffer.

9. The control apparatus according to claim 7, wherein the controller is further configured to read an image,
wherein the controller outputs an instruction when the control apparatus is in a first power state in which the control apparatus can start reading a document, and
wherein the controller outputs the instruction when the control apparatus is in a second power state, with power consumption lower than that of the first power state in which the control apparatus cannot start reading a document.

10. The control apparatus according to claim 1, wherein the read image data is transmitted to a next module.

11. A control method of a static random access memory (SRAM) connected to a printing apparatus, capable of having a first power mode, a second power mode that is capable of holding data and save power more than the first power mode, and a third power mode that is not capable of holding data but is capable of saving more power than the second power mode, the control method comprising:
providing power to the SRAM to write image data into the SRAM;
writing the image data into the powered SRAM while a power mode of the SRAM is the first power mode,
reading the written image data from the powered SRAM while the power mode of the SRAM is the first power mode, and
shifting the power mode of the powered SRAM from the first power mode to the third power mode based on a determination that all of the written image data has been read from the SRAM.

12. A control apparatus comprising:
a controller configured to control a static random access memory (SRAM) capable of having a first power mode, a second power mode that is capable of holding data and saving power more than the first power mode and a third power mode that is not capable of holding data but is capable of saving more power than the second power mode,
wherein the controller is configured to:
provide power to the SRAM to write image data into the SRAM and set the first power mode;
write the image data into the powered SRAM while a power mode of the SRAM is the first power mode;
read the written image data from the powered SRAM while the power mode of the SRAM is the first power mode; and
shift the power mode of the powered SRAM from the first power mode to the third power mode based on a determination that all of the written image data has been read from the SRAM.

* * * * *